United States Patent
Ross et al.

(10) Patent No.: US 6,953,094 B2
(45) Date of Patent: *Oct. 11, 2005

(54) SUBTERRANEAN WELL COMPLETION INCORPORATING DOWNHOLE-PARKABLE ROBOT THEREIN

(75) Inventors: Colby Munro Ross, Carrollton, TX (US); Robert L. Thurman, Frisco, TX (US); Syed Hamid, Dallas, TX (US); Clifford David Wohleb, Jr., Fort Worth, TX (US); Ronald W. McGregor, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 60 days.

This patent is subject to a terminal disclaimer.

(21) Appl. No.: 10/253,061

(22) Filed: Sep. 24, 2002

(65) Prior Publication Data

US 2004/0055746 A1 Mar. 25, 2004

Related U.S. Application Data

(63) Continuation-in-part of application No. 10/174,675, filed on Jun. 19, 2002, now Pat. No. 6,799,633.

(51) Int. Cl.[7] .......................... E21B 23/00; E21B 47/00
(52) U.S. Cl. ..................... 166/381; 166/50; 166/65.1; 166/313
(58) Field of Search .................. 166/381, 65.1, 166/50, 313

(56) References Cited

U.S. PATENT DOCUMENTS

| | | | | |
|---|---|---|---|---|
| 4,676,310 A | * | 6/1987 | Scherbatskoy et al. | 340/853.4 |
| 5,947,213 A | * | 9/1999 | Angle et al. | 175/24 |
| 5,959,547 A | * | 9/1999 | Tubel et al. | 340/853.2 |
| 6,026,911 A | | 2/2000 | Angle et al. | |
| 6,112,809 A | | 9/2000 | Angle | |
| 6,279,658 B1 | * | 8/2001 | Donovan et al. | 166/313 |
| 6,378,627 B1 | * | 4/2002 | Tubel et al. | 175/24 |
| 6,405,798 B1 | * | 6/2002 | Barrett et al. | 166/250.01 |
| 6,431,270 B1 | | 8/2002 | Angle | |
| 6,575,248 B2 | * | 6/2003 | Zhang et al. | 166/338 |
| 6,799,633 B2 | * | 10/2004 | McGregor | 166/250.01 |
| 2002/0066556 A1 | * | 6/2002 | Goode et al. | 166/53 |
| 2003/0029618 A1 | * | 2/2003 | Schempf et al. | 166/343 |
| 2003/0196814 A1 | * | 10/2003 | Zhang et al. | 166/335 |
| 2003/0234110 A1 | * | 12/2003 | McGregor | 166/373 |

* cited by examiner

Primary Examiner—Hoang Dang
(74) Attorney, Agent, or Firm—J. Richard Konneker

(57) ABSTRACT

A subterranean well completion has a tubular structure in which a remote controlled robot is permanently disposed. The robot is self-propelled, programmable, receives instructions from and communicates data to the surface, and is adapted to receive power from a downhole source and perform a variety of well tasks such as, for example, positioning valves and other well tools and sensing the values of predetermined downhole parameters and relaying the sensed information to the surface. The robot, which is operable without physical intervention through the tubular structure to the robot, propels itself to a location in the tubular structure at which a desired well task is to be performed, performs the task and then parks itself in the tubular structure until another well task is to be performed by the robot.

36 Claims, 8 Drawing Sheets

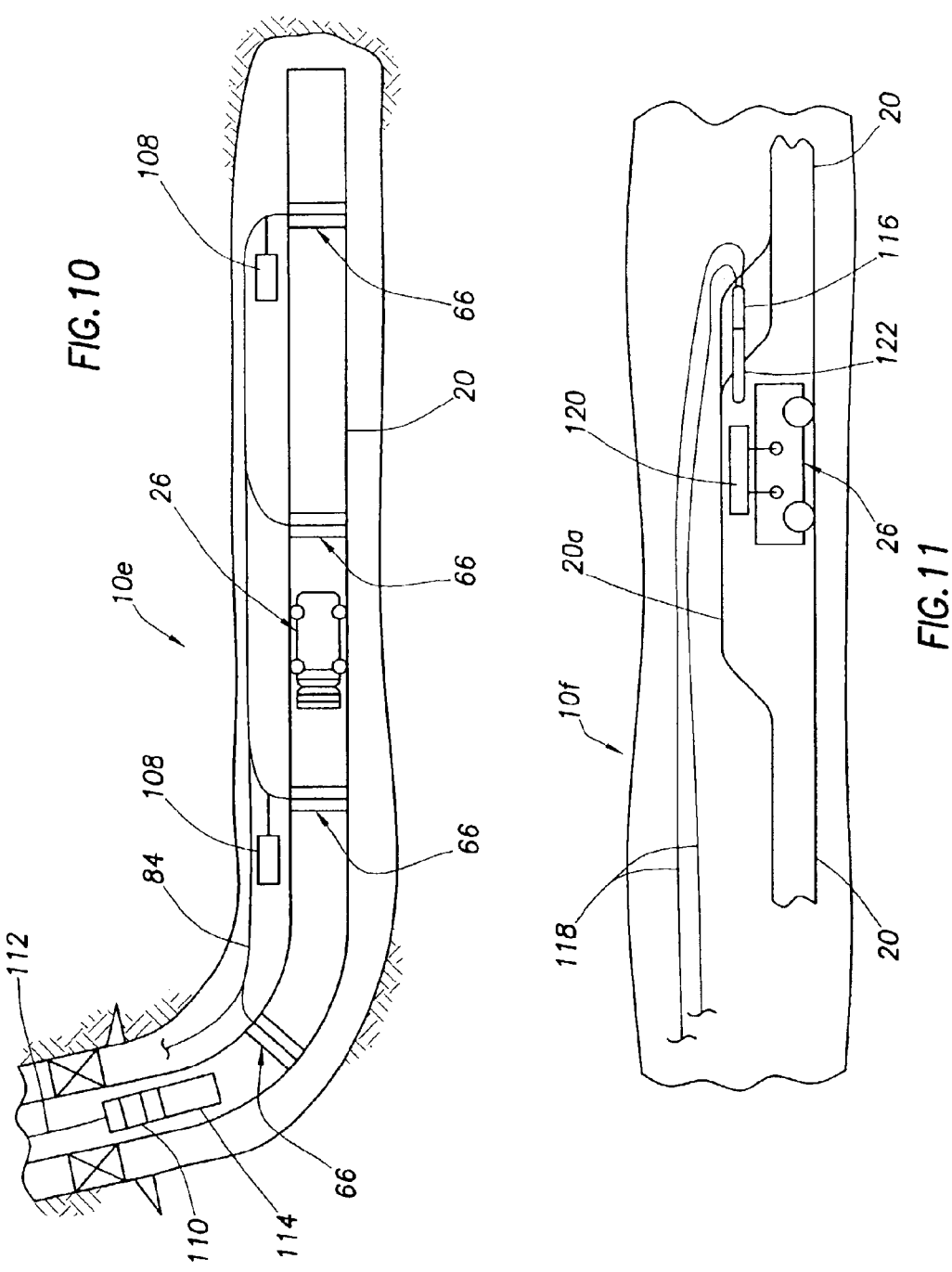

SUBTERRANEAN WELL COMPLETION INCORPORATING DOWNHOLE-PARKABLE ROBOT THEREIN

CROSS-REFERENCE TO RELATED APPLICATION

This application is a continuation-in-part of U.S. application Ser. No. 10/174,675 filed on Jun. 19, 2002 now U.S. Pat. No. 6,799,633, and entitled "DOCKABLE DIRECT MECHANICAL ACTUATOR FOR DOWNHOLE TOOLS AND METHOD", such prior application being incorporated by reference herein in its entirety.

BACKGROUND OF THE INVENTION

The present invention generally relates to subterranean well completions and associated operations performed therein and, in a preferred embodiment thereof, more particularly relates to a subterranean well completion incorporating therein a parkable robot which is capable of performing a variety of operations in the well completion, communicating with and receiving instructions from the surface, and receiving power from a downhole source.

Conventional subterranean well completions used to flow selected subterranean fluids, such as oil and gas, to the surface typically are relatively passive systems with only limited capabilities for sensing and reacting to changes in downhole conditions. It is often the case that external intervention from the surface is required to respond to changes in downhole operating environment by, for example, altering the system flow rate via the closing a valve or sliding side door using intervention equipment sent down into the well.

In automated, remotely controlled wells (often referred to in the industry as "smar t" wells or intelligent completions), the wells include in their completion hydraulic and/or electrically operated valves and other variably positionable well tools. This requires the running of hydraulic and/or electrical control lines to the actuators of the valves and other well tools—a requirement which correspondingly increases the cost of the completion and reduces its operational reliability. Moreover, downhole repair and modification also typically require costly and time-consuming physical intervention into the completion.

As can be readily be seen from the foregoing, a need exists for a well completion having control capabilities that eliminate or at least substantially reduce the above-mentioned problems, limitations and disadvantages often associated with conventional well completions. It is to this need that the present invention is primarily directed.

SUMMARY OF THE INVENTION

In carrying out principles of the present invention, in accordance with a preferred embodiment thereof, a specially designed subterranean well completion is provided which has a tubular structure extending through the earth, and a remote controlled robot disposed in the tubular structure and being capable of performing downhole well tasks, the robot being operable to utilize power from a source thereof to propel itself along the interior of the tubular structure, perform a predetermined downhole well task, and then park within the tubular structure until another well task is to be performed by the robot.

The source of power representatively includes a rechargeable electrical battery carried by the robot, and downhole electrical recharging apparatus useable to recharge the robot's battery. Alternatively, the source of power may include a downhole power source—for example the flow energy of fluid flowing through the tubular structure. To use this illustrative type of downhole power source, a turbine carried by the robot is capable of being rotated by fluid flowing through the tubular structure and is useable to recharge the robot's onboard battery. Alternatively, the turbine may be driven by the battery and used to propel the robot along the interior of the tubular structure.

The downhole electrical recharging apparatus may be of a variety of types including one or more electrical charging structures carried by the tubular structure and directly engageable or inductively coupleable by a charge receiving structure carried by the robot. The charging structures may receive electrical power from the surface, battery structures carried by the tubular structures, or a combination thereof. In one aspect of the invention, the charging structures are incorporated in docking stations to which the robot may be releasably docked while the downhole robot recharging process takes place. Such recharging may take place automatically upon docking of the robot, or the robot may send a recharging request signal to initiate recharging. Additionally, the docking stations may be adapted to transmit a signal, responsive to the docking of the robot thereto, which is indicative of the position of the robot in the tubular structure.

Other robot battery recharging techniques include the positioning of a charging structure in a side pocket area of the tubular structure and configuring the robot to conductively engage the charging structure and recharge the robot's onboard battery, or to remove a rechargeable battery from the charging structure and carry it away for use in charging another battery downhole. Additionally, the robot and/or a downhole recharging battery may be recharged by lowering a recharging structure through the tubular structure on an electrical line and into electrical contact with the robot or a downhole battery to be recharged. The robot may also remove a battery from the lowered recharging structure and use the removed battery at another location within the subterranean completion.

The robot preferably has a reprogrammable control system and may be pre-programmed to autonomously perform predetermined downhole well tasks. Additionally, using a communication system portion of the robot informationally linked to the surface, the robot may be reprogrammed to perform additional tasks downhole. This linkage of the robot's communication system may be via wireless transmission, or by linkage to a communication structure carried by the tubular structure and connected by suitable communication cabling to the surface.

In order to facilitate the substantially permanent positioning of the robot within the subterranean well completion, the robot is given a configuration which, at the location of the robot within the tubular structure, laterally blocks no more than about eighty percent of the flow area of the tubular structure, thereby facilitating continuing fluid flow past the robot through the interior of the tubular structure. In one embodiment of the robot it has a tubular, open-ended both that permits well fluid to flow both through and around the robot.

In accordance with another aspect of the invention, the robot has a propulsion system that includes retractible external drive wheels or chains, the retraction of which permits the robot to travel in either axial direction between adjacent tubular structure portions having different diameters, perform a well task in the entered portion and then return to the other portion.

The robot also has a work structure which may be constructed to perform a variety of downhole well tasks which include, by way of example and not of limitation, sensing various downhole well parameters, retrieving values of well parameters sensed by sensors external to the robot, removing sensors from the tubular structure, reprogramming sensors external to the robot, perforating the tubular structure at predetermined locations therein with a reloadable perforation magazine, repairing perforations in the tubular structure, performing a welding operation in the tubular structure, temporarily forming a fluid flow barrier in the tubular structure, shifting flow control members within the tubular structure, variably throttling fluid flow through an opening in the tubular structure, and deploying a subsystem structure into the tubular structure.

BRIEF DESCRIPTION OF THE DRAWINGS

FIG. 3 is an enlarged scale schematic end view of an alternate embodiment of the robot illustrated in FIG. 1;

FIG. 4 is a schematic cross-sectional view through a first alternate embodiment of the FIG. 1 well completion and illustrating the robot being used to shift a flow control device incorporated in the completion;

FIG. 10 is a schematic cross-sectional view through a fifth alternate embodiment of the FIG. 1 well completion and illustrates the through-tubing conveyance of structures for replenishing the downhole robot electrical power supply;

FIG. 11 is a schematic cross-sectional view of a sixth alternate embodiment of the FIG. 1 well completion and illustrates the use of a tubing side pocket area to house battery structure useable to supply electrical power to the robot;

DETAILED DESCRIPTION

Figure 1:
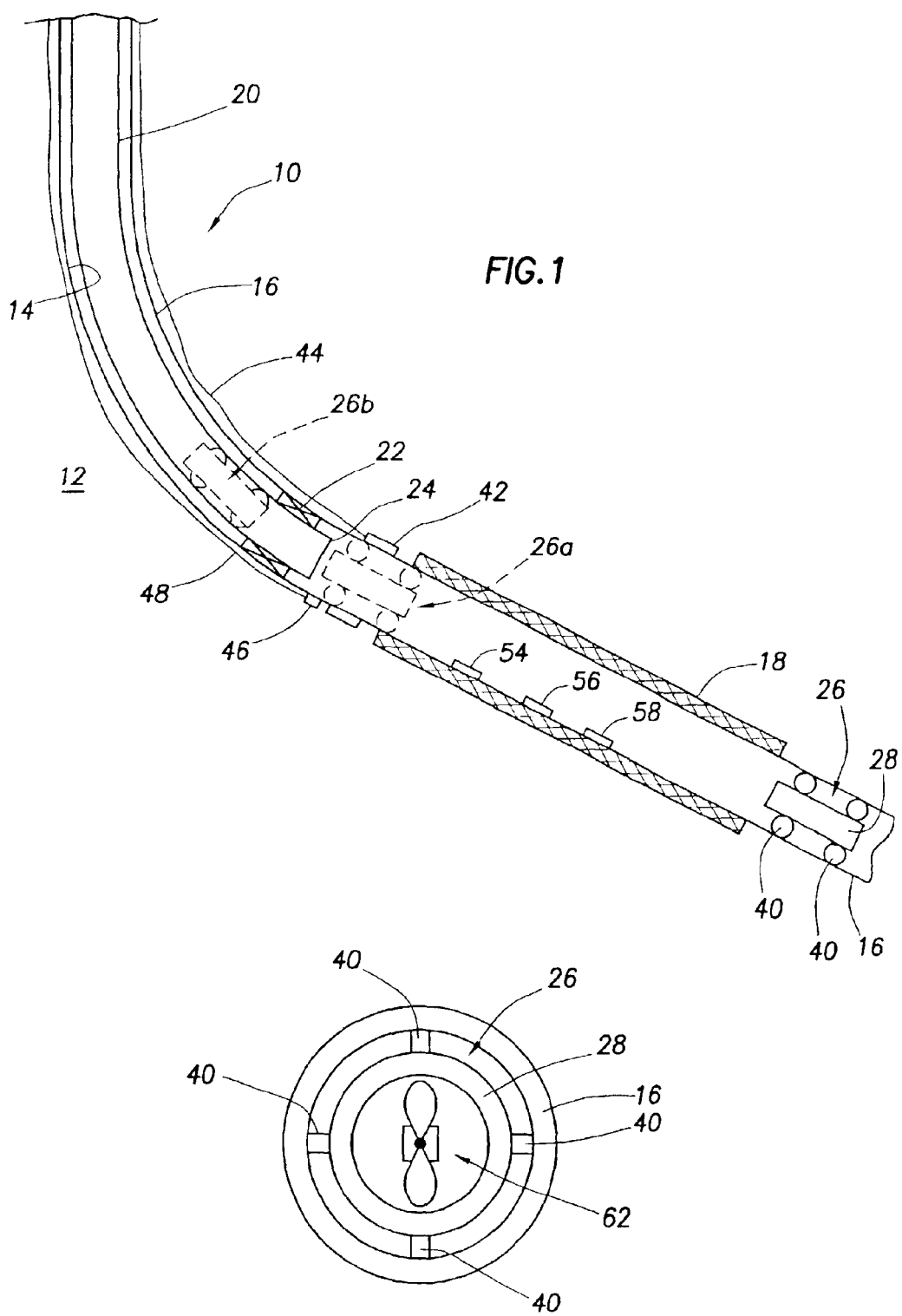
FIG. 1 is a schematic cross-sectional view through a representative subterranean well completion embodying principles of the present invention and having a remote controlled, programmable, work-performing robot disposed in a tubular portion of the completion.

Cross-sectionally illustrated in schematic form in FIG. 1 is a subterranean well completion 10 that extends through the earth 12 and embodies principles of the present invention. In the following description of the well completion 10 and other apparatus and methods described herein, directional terms, such as "ab ove", "below", "u pper", "lower", etc., are used only for convenience in referring to the accompanying drawings, Specifically, the term "ab ove" is used herein to designate a direction toward the earth's surface along a wellbore, and the term "below" is used herein to designate a direction away from the earth's surface along a wellbore, even though the wellbore may not be substantially vertical. Additionally, it is to be understood that the various embodiments of the present invention described herein may be utilized in various orientations, such as inclined, inverted, horizontal, vertical, etc. and in various configurations, without departing from the principles of the present invention.

Well completion 10 includes a wellbore 14 extending through the earth 12 and appropriately lined with a tubular well casing 16 having installed in a lower longitudinal portion thereof a schematically depicted tubular sand control screen 18. Another tubular structure, representatively in the form of a length of production tubing 20, extends downwardly through the casing 16, is sealed to the interior side surface of the casing 16 by an annular seal or packer structure 22, and has an open lower end 24, disposed uphole of the sand screen 18, for receiving well fluid from the casing 16 So that the received well fluid can be flowed upwardly to the surface through the production tubing 20.

Figure 2:
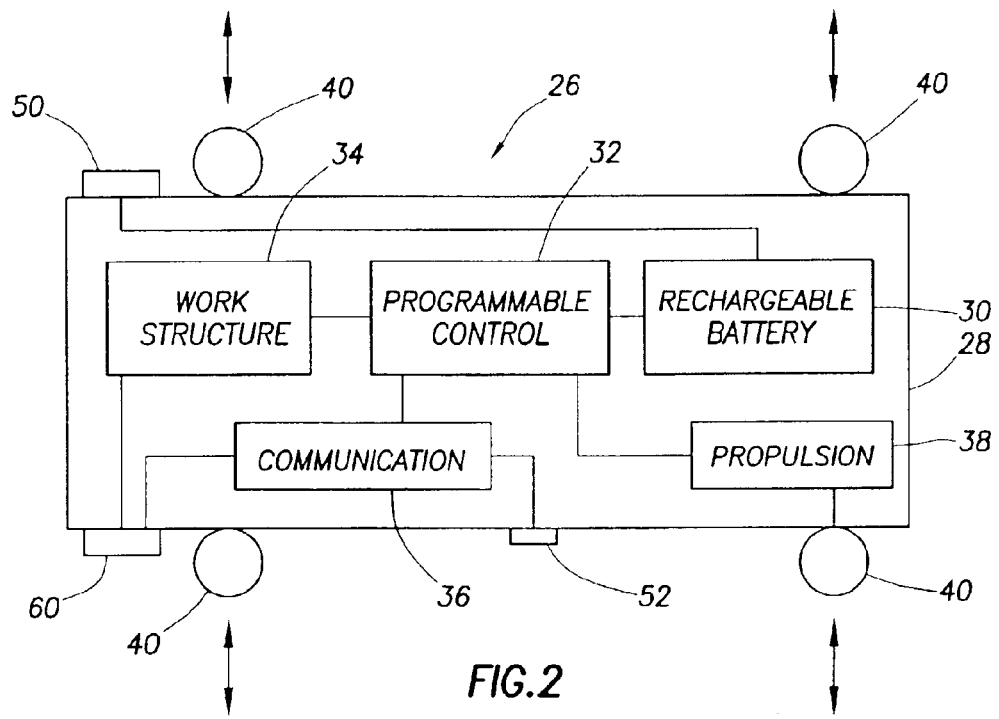
FIG. 2 is an enlarged scale, schematic side elevational view of the robot showing, in block diagram form, some of its onboard components and systems.

According to a feature of the present invention, a programmable, self-propelled, work-performing robot 26 is permanently disposed within the interior of the well completion 10 (except when removed for maintenance, repair of upgrading), and is representatively shown in FIG. 1, in a solid line parked position, within the casing 16 somewhat below the sand screen 18. As schematically depicted in FIG. 2, the robot 26 has a body 28 with various onboard components and systems that are operatively interconnected as indicated and representatively include a rechargeable battery 30, a programmable control system 32, a work structure 34, a communication system 36, and a propulsion system 38 that controls an exterior driving structure such as retractible driving wheels 40 which permit the robot 26 to propel itself in opposite longitudinal directions along the interior of the well completion 10 within its tubular structures 16,20 and, if necessary, to the surface.

Via the programmable control section 32, the onboard rechargeable battery 30 supplies power to the work structure 34, the communication system 36 and the propulsion system 38. The work structure 34 enables the robot 26 to perform at least one downhole well task, and the communication system 36 enables instructional and informational data transfer between the robot and the surface as later described herein.

The well completion 10 also includes an electrical power transfer structure 42 representatively carried on the casing 16 and supplied with electrical power via wiring 44 extending from the surface thereto, and a communication module 46, also representatively carried on the casing 16, and connected to the surface by a communication cable such as a fiber optic cable 48. Robot 26 externally carries a power receiving structure 50 which is coupled to the rechargeable battery 30 and is connectable to the power transfer structure 42 (either inductively or by direct contact therewith as the case may be) to transfer electrical power to the battery 30 to recharge it.

The communication system 36 includes an externally mounted communication structure 52 which is communicatable, as later described herein, with the communication module 46 to permit data and instructional communication between the robot 26 and the surface. As schematically shown in FIG. 1, three sensors 54,56,58 are disposed within the sand screen 18 and may respectively be temperature, pressure and density sensors. The work structure 34 of the robot 26 representatively includes an exterior sensor module 60 which enables the robot 26 to perform, as later described herein, the downhole well task of detecting the values of the well parameters being sensed by the sensors 54,56,58.

In FIG. 1, the robot 26 is shown (in solid line form) in a "parked" position somewhat downhole from the well screen 18 and ready to perform its sensor-monitoring well task. This task, like other subsequently described well tasks that the robot may also perform, may be a pre-programmed task which the robot autonomously carries out, or may be effected by instructions sent downhole to the robot's programmable control system 32 via the robot's communication system 36.

When the sensor-monitoring well task is to be performed by the robot 26 the robot 26 propels itself in an uphole direction to its dotted line position 26a (see FIG. 1). As the robot 26 approaches this position within the casing 16, its sensor module 60 passes by and retrieves sensed parameter values from the three sensors 54,56 and 58. When the robot 26 reaches its dotted line position 26a, its external communication structure is informationally coupled to the communication module 46, and the retrieved sensor information is transmitted to the surface via the line 48. Alternatively, the external communication structure 52 may be operative to provide wireless communication to and from the earth. While the robot 26 is in its dotted line work-performing position 26a its power receiving structure 50 is operatively coupled to the downhole electrical power transfer structure 42, thereby permitting the onboard robot battery 30 to be recharged as necessary from this downhole electrical power source.

After this downhole well task is performed by the robot 26, the robot propels itself back down the casing 16 to its solid line parked position where it awaits being called upon to perform another well task. As used herein, the terms "another" or "second" well task contemplate either the subsequent performance of a different well task, or a repeat performance of some or all of the same well task.

As can be seen in FIG. 1 the overall tubular structure through which well fluid flows upwardly to the surface is defined by the production tubing 20 and a downwardly adjacent portion of the larger interior diameter casing 16. The configuration of the robot 26, including the provision of its retractible drive wheels 40 (which may be tracked or untracked) permits it to enter either the smaller or larger diameter tubular portion from the other portion and perform one or more well tasks in the entered tubular portion. For example, as illustrated in FIG. 1, the robot 26 may propel itself from its solid line parked position within the casing 16 to its dotted line position 26b within the production tubing 20, perform a well task within the production tubing 20, and then return to its parked solid line position within the casing 16.

It will be readily appreciated that the ability of the "resident" robot 26 to park itself within the well completion until called upon to perform a predetermined well task provides a reliable mechanism for performing various well tasks (as later described herein) without the necessity of providing complicated downhole actuators and their associated downhole hydraulic and electrical lines, or the necessity of physical intervention into the well completion from the surface to perform these well tasks. While the robot 26 is illustrated and described herein as being remotely controlled within the well completion without any physical connection of the robot to the surface via the interior of the tubular structure 16,20, it will also be appreciated that, if desired, the robot could be connected to the surface via a suitable umbilical cable structure (not shown) extending through the tubular structures 16,20 and providing electrical power to the robot and data transfer between the robot and the earth. Such permanent umbilical cord could be utilized to operatively dispose the robot within the completion 10 or, as illustrated and currently preferred, the robot 26 could propel itself downwardly to an operative position within the completion or could be disposed in such position by lowering it on a subsequently removed lowering structure.

According to another feature of this present invention, the robot 26 is configured in a manner such that at its location within the downhole tubular structure it laterally obstructs no more than about 80 percent of the flow area of the tubular structure. This advantageously permits the maintenance of fluid flow through the well completion 10 while the robot 26 is either parked or performing one of a variety of downhole well tasks. The body 28 of the robot 26 may be of any suitable configuration to permit fluid flow within the completion to readily pass the robot in an axial direction through the tubular structure. For example, as shown in FIG. 3, the robot body 28 may be of a hollow tubular, open-ended configuration to let well fluid flowing axially through the tubular structure (for example, a portion of the casing 16) pass both through and around the robot 26.

The robot's onboard rechargeable electric battery 30 (see FIG. 2) is representatively shown as being rechargeable from a downhole power source (for example, the power transfer structure 42 shown in FIG. 1), and being used to propel the robot along the completion interior by forcibly rotating the wheels 40. However, as shown in FIG. 3, the robot 26 could alternatively be provided with a turbine structure 62 disposed in the interior of the hollow, open-ended robot body 28 and rotationally driven by fluid flowing axially through the body 28. This fluid flow-created rotation of the turbine 62 may be utilized to recharge the onboard battery 30 as needed. Alternatively, instead of using the battery 30 to drive the wheels 40, the battery could be used to rotate the turbine in a manner causing the rotating turbine to propel the robot 26 along the interior of the well completion tubular structure through fluid therein.

An alternate embodiment 10*a* of the previously described subterranean well completion 10 is schematically depicted in FIG. 4 and includes a length of production tubing 20 (which may be a portion of a screened interval) in which a longitudinally spaced series of axially shiftable flow control sleeve structures 64 are operatively installed. Uphole of the sleeve structures 64 is a specially designed robot docking/recharging structure 66 which is shown, at a larger scale, in quarter sectional format in FIG. 5. The robot 26 is movably disposed in the production tubing 20 which is representatively capped in a suitable manner, as at 68, at its downhole end. For purposes later described herein, at an end thereof the robot 26 is provided with an annular profiled docking structure 70, and an annular charge-receiving structure 72 coupled to its onboard rechargeable electric battery 30.

Figure 5:
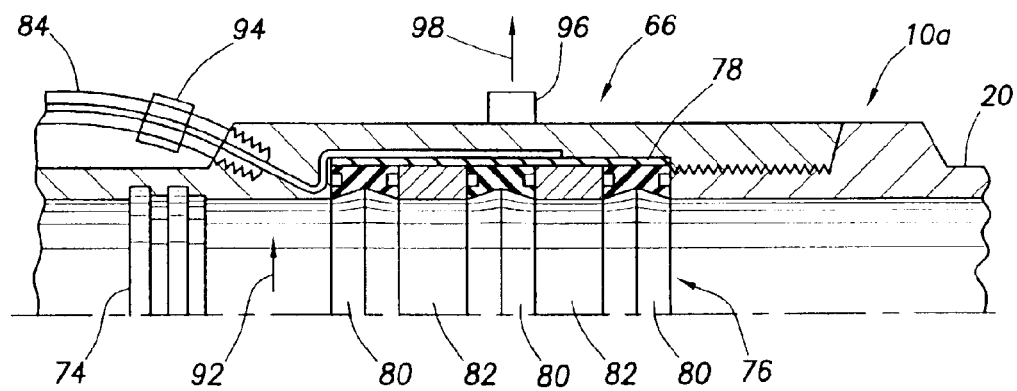
FIG. 5 is an enlarged scale, schematic quarter sectional view through a robot docking/electrical charging station incorporated in the FIG. 4 well completion.

With reference now to FIG. 5, the docking/recharging structure 66 includes an annular locating profile 74 formed in the interior side surface of the production tubing 20, and an annular electrical connector 76 also disposed in the interior of the production tubing 20. The annular connector 76 comprises an outer annular insulator sleeve 78 that circumscribes alternating annular wiper and connector structures 80 and 82. Electrical recharging power is supplied to the connectors 82 from the surface by a suitable electrical power cable 84.

From its dotted line parked position 26*a* at the downhole end of the production tubing 20 (see FIG. 4), the robot 26 is self-propelled in an uphole direction through the tubing 20 to adjacent one of the sleeves 64 which needs to be shifted. In performing this well task of shifting one of the sleeves 64 the work structure 34 of the robot 26 includes an axially shiftable arm portion 86 which is used to appropriately shift the selected sleeve 64, as indicated by the double-ended arrow 88. Then, as indicated by the arrow 90, the robot 26 propels itself back to its dotted line parked position 26*a* within the tubing 20 to await the performance of another well task within the tubing 20.

To recharge its onboard electrical battery 30, the robot 26 propels itself uphole to the docking/recharging structure 66 at which the robot 26 reaches its dotted line docked position 26*b*. With the robot in this docked position 26*b*, its docking structure 70 is complementarily and releasably interlocked with the internal tubing profile 74, and its charge-receiving structure 72 is complementarily engaged with the electrical connector 76 within the tubing 20. Alternatively, the robot and tubing electrical connector portions 72,76 may be configured for inductive coupling thereof instead of direct interengagement. After the onboard robot battery 30 is recharged, the robot 26 propels itself back to its dotted line parked position 26*a*, or to a work position adjacent one of the sleeves, as needed.

The illustrated tubing connector structure 76 is illustrated as being "live" so that contact between the robot and tubing connectors 72,76 automatically starts the recharging of the robot's onboard electric battery 30. Alternatively, the robot 26 may be programmed to output a charging initiation signal 92 to a receiver/switch structure 94 associated with the power cable 84 (or an equivalent structure associated with the control system 32 of the robot) to initiate charging upon receipt of the signal 92. Using a suitable transmitter structure 96, a position output signal 98 may be generated in response to docking and/or charging of the robot 26 and used to indicate the downhole position of the robot 26 within the well completion 10*a*. Position signal 98 may be transmitted directly to the earth in a wireless manner or through a tubing mounted communication module (such as the previously described communication module 46 schematically depicted in FIG. 1) via a communication cable.

Figure 6:
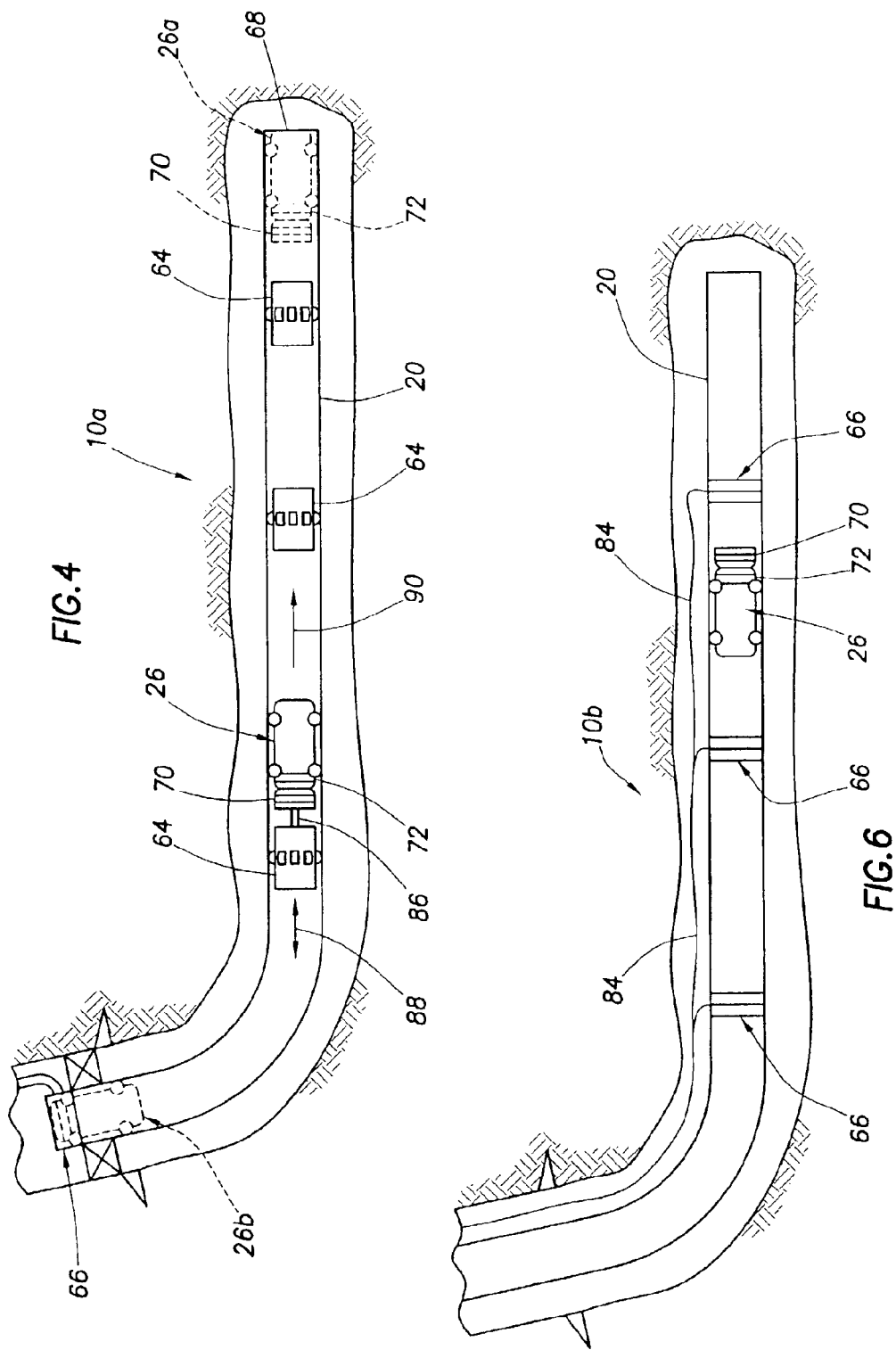
FIG. 6 is a schematic cross-sectional view through a second alternate embodiment of the FIG. 1 well completion and illustrating the incorporation of multiple robot electrical charging stations therein which receive electrical power from the surface.

A second alternate embodiment 10*b* of the previously described subterranean well completion 10 is cross-sectionally and schematically depicted in FIG. 6. In completion embodiment 10*b* the tubing 20 is provided with a longitudinally spaced series of the previously described robot docking/recharging structures 66 to which electrical power is supplied from the surface via the power cable 84. This provision of a spaced apart series of docking/recharging structures 66 enables the robot 26 to periodically recharge its onboard battery 30 in the event that the robot has to traverse a great length of the interior of the tubing 20. The robot 26 can also be programmed to travel to the nearest docking/recharging structure 66 when its battery 30 needs recharging.

Figure 7:
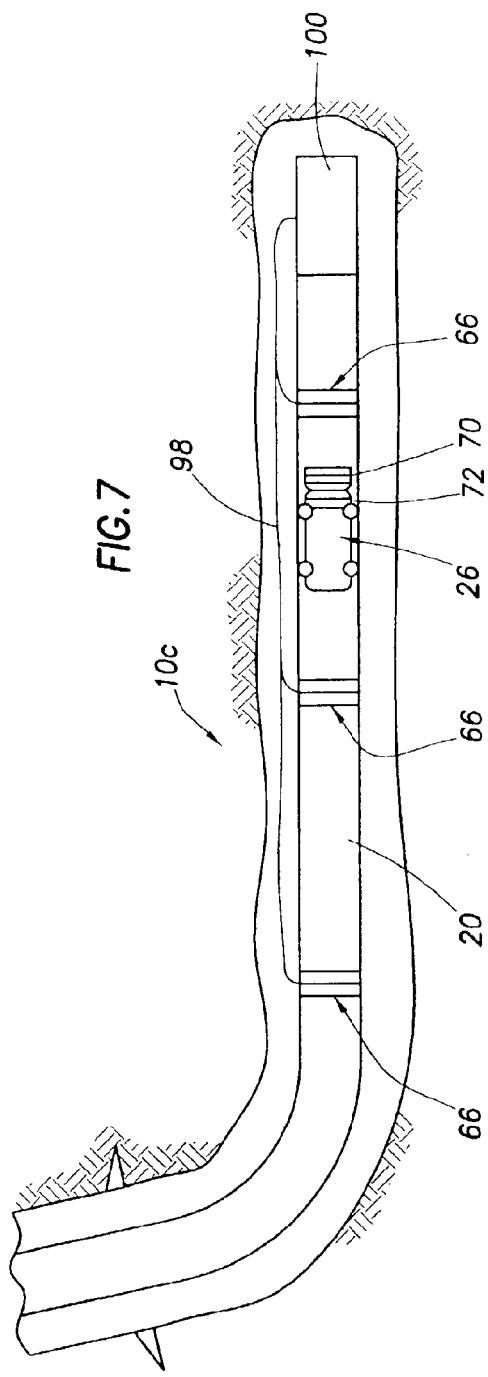
FIG. 7 is a schematic cross-sectional view through a third alternate embodiment of the FIG. 1 well completion and illustrating the use of a main downhole battery used to supply power to multiple robot electrical charging stations.

A third alternate embodiment 10*c* of the previously described subterranean well completion 10 is cross-sectionally and schematically depicted in FIG. 7. The completion embodiment 10*c* is identical to the completion embodiment 10*b* shown in FIG. 6 with the exception that the robot docking/recharging structures 66 are not supplied with electrical power from the surface. Instead, they are supplied with electrical power, via suitable wiring 98, by a main long-life electrical storage battery 100 representatively mounted on the downhole end of the tubing 20.

Figure 8:
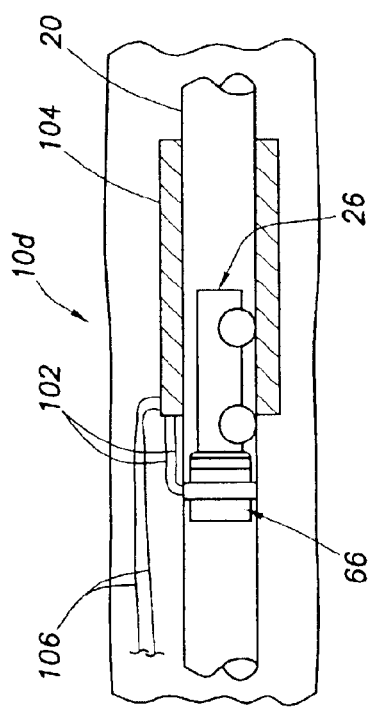
FIG. 8 is a schematic cross-sectional view through a fourth alternate embodiment of the FIG. 1 well completion and illustrates the trickle charging of an external main battery disposed on the tubular structure within the robot is disposed.

A fourth alternate embodiment 10*d* of the previously described subterranean well completion 10 is cross-sectionally and schematically depicted in FIG. 8. In the completion embodiment 10*d*, a robot docking/recharging structure 66 carried by the tubing 20 is supplied with electrical power, via wiring 102, by an annular electric battery 104 coaxially and externally carried on the tubing 20. The battery 104 is continuously trickle charged via trickle charging wiring 106 extending to the surface.

Figure 9:
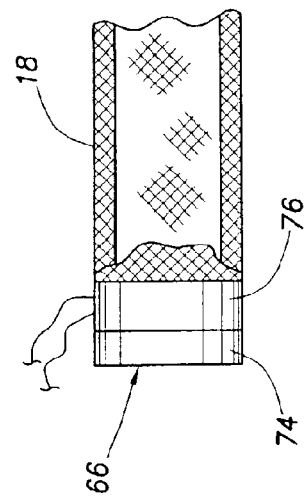
FIG. 9 is a partially sectioned side elevational view of a portion of a tubular well screen structure having an integral robot docking/recharging station.

Referring now to FIG. 9, while the previously described robot docking/recharging structures 66 have been representatively been connected directly in a downhole tubular structure (such as casing or production tubing), a robot docking/recharging structure 66 may also be incorporated in directly in an operating component which, in turn, is connected into the tubular structure. For example, as illustrated in FIG. 9, a robot docking/recharging structure 66 may be incorporated into a well screen 18 similar to that shown in FIG. 1. Representatively, the structure 66 is shown connected to an end of the screen 18, but could alternatively be positioned in a longitudinally intermediate position of the screen if desired.

A fifth alternate embodiment 10*e* of the previously described subterranean well completion 10 is cross-sectionally and schematically depicted in FIG. 10. In the completion embodiment 10*e*, some of the robot docking/recharging structures 66 carried by the tubing 20 are directly supplied with electrical power by wiring 84 extended downwardly from the surface, while other ones of the robot docking/recharging structures are supplied with electrical power by adjacent batteries 108 connected to the wiring 84. A further source of downhole electrical power if provided by lowering a recharging connector 110 through the tubing 20 on an electrical power line 112 electrically coupled to the connector 110. The recharging connector 110 may by lowered into connection with the robot 26 to recharge its onboard battery 30 and/or may be electrically coupled downhole to one of the batteries 108 to recharge it. Additionally, an electrical battery 114 may be releasably secured to the recharging connector 110 and delivered to the robot 26 for transport by the robot 26 to one of the batteries 108 for use in recharging it.

A sixth alternate embodiment 10*f* of the previously described subterranean well completion 10 is cross-sectionally and schematically depicted in FIG. 11. In the completion embodiment 10*f*, its tubing portion 20 has a side pocket 20*a* formed therein. Projecting inwardly through one end of the side pocket 20*a* is a battery pack 116 supplied with electrical power via electrical lines 118 extending downhole from the surface. The robot 26 is provided with an upwardly extensible arm structure 120.

When the onboard battery 30 of the robot 26 needs recharging, the robot 26 propels itself to the side pocket 20*a*, upwardly extends the arm 120 and operatively couples the arm 120 to the battery pack 116. Electrical recharging power is then transferred from the battery pack 116, through the arm 120, and to the robot's onboard battery 30. After recharging is complete, the robot 26 uncouples the arm 120 from the battery pack 116, lowers the arm 120, and propels itself away from the side pocket 20*a*.

Alternatively, the battery pack 116 may carry a rechargeable battery 122 which may be removed by the arm 120 and carried away by the robot 26 to provide it with additional electrical power or for use in recharging another battery at another location in the tubing 20. The removed battery 122 may subsequently be returned by the robot 26 to the battery pack 116 for recharging.

Figure 12:
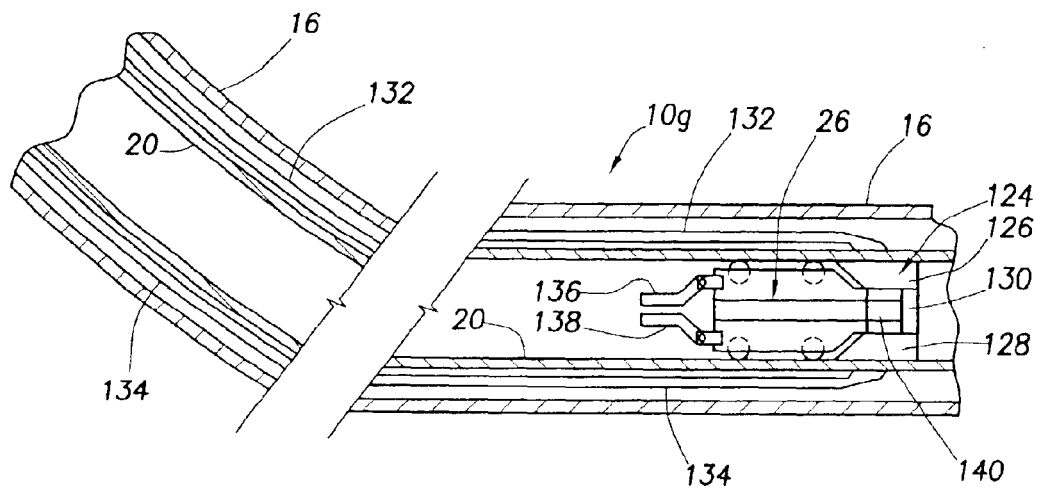
FIG. 12 is a schematic cross-sectional view of a seventh alternate embodiment of the FIG. 1 well completion and illustrates modified versions of the robot and its associated downhole electrical charging apparatus.

A seventh alternate embodiment 10*g* of the previously described subterranean well completion is cross-sectionally and schematically illustrated in FIG. 12. In the completion embodiment 10*g*, a combination recharging/communication structure 124 projects into the interior of the tubing 20. The structure 124 has a recharging portion 126 and a communication portion 128 separated therefrom by a plug-in space 130. The recharging portion receives electrical power from the surface via a suitable power cable 132, and the communication portion 128 is informationally linked to the surface via a suitable communication cable 134.

The robot 26 has on one end thereof a pair of sensor probes 136,138 which directly sense the values of predetermined well parameters such as, for example, pressure, temperature, density, chemical composition, flow velocity and the like, and transmit the sensed values to the robot's communication system. At the opposite end of the robot 26 is a connector plug portion 140. To electrically and informationally couple the robot 26 to the surface, the robot is simply moved toward the structure 124 until its plug portion 140 is operatively received in the plug-in space 130. This couples the robot's onboard battery 30 to the electrical recharging portion 126, and also couples the robot's communication system 36 to the surface (via the communication portion 128 and the cable 134) So that the sensor probe data can be transmitted to the surface and information can be transmitted from the surface to the robot.

Schematically depicted in FIGS. 13–21 are various representative downhole well tasks that the robot's work structure 34 may be configured to perform. While for the most part the various descriptions of the robot embodiments shown in FIGS. 13–21 will be of a single well task the robot is adapted to perform, it will be readily appreciated by those of skill in this particular art that a given robot embodiment may be equipped to perform multiple downhole well tasks to suit a particular subterranean well completion.

Figure 13:
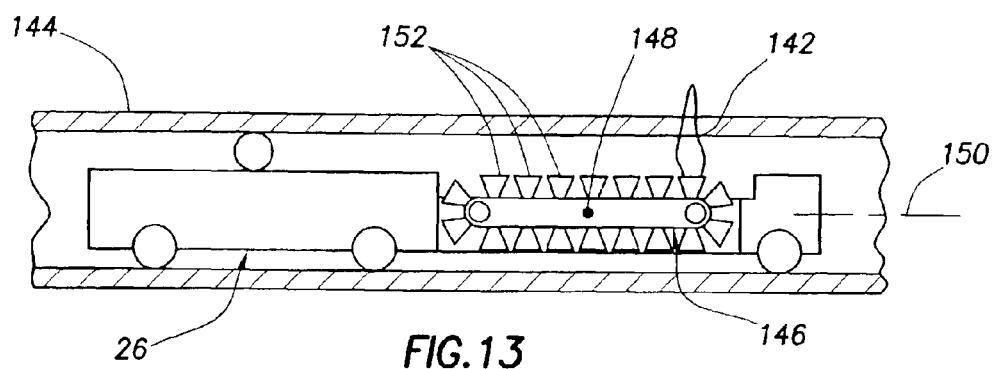
FIG. 13 is a schematic cross-sectional view of an embodiment of the robot being used to perforate a tubular structure within which the robot is movably disposed.

The well task that the work structure 34 of the FIG. 13 robot 26 is equipped to perform is the creation of a perforation 142 in the tubular structure 144 (such as a length of casing) within which the robot is movably disposed. To perform this task, the robot 26 is provided with a wheel-supported, reloadable magazine structure 146 that is rotatable about an axis 148 which is transverse to the axis 150 of the tubular structure 144, and is also rotatable about the tubular structure axis 150. The rotatable magazine structure 146 carries a series of perforating cups 152, selected ones of which may be fired to create one or more perforations 142 in the tubular structure 144. This permits each perforation 142 to be accurately located on the tubular structure 144 both axially and circumferentially.

Figure 14:
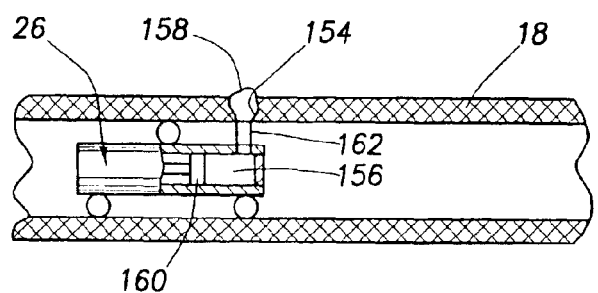
FIG. 14 is a schematic cross-sectional view of an embodiment of the robot being used to repair a perforation in a tubular well screen structure.

The well task that the work structure 34 of the FIG. 14 robot 26 is equipped to perform is the repair of a perforation 154 in the tubular structure (representatively a well screen 18) in which the robot 26 is movably disposed. To effect this perforation repair task, the robot 26 is equipped with a chamber 156 filled with a flowable repair material 158. A movable piston 160 is disposed within the chamber 156 and may be used to force the repair material 158 out of the chamber 156 into the perforation 154 via a hollow discharge member 162 aligned with the perforation 154.

Figure 16:
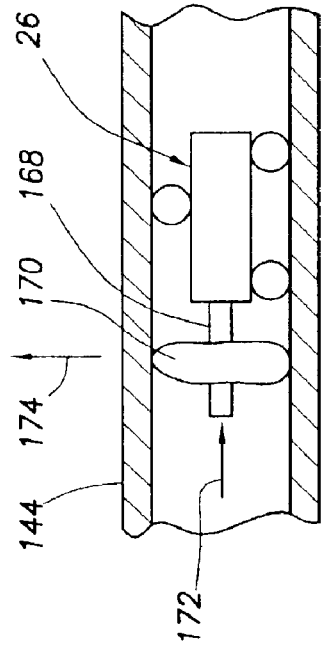
FIGS. 15 and 16 are schematic side elevational views of embodiments of the robot being used to seal off portions of tubular structures within which they are movably disposed.
Figure 15:
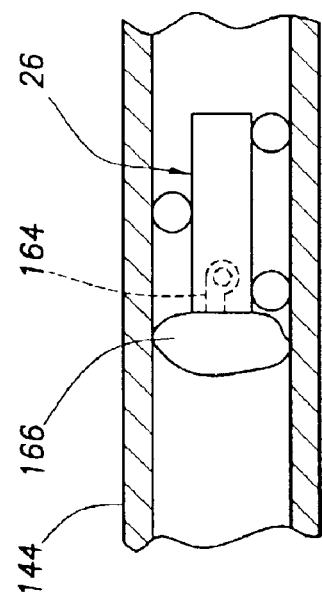

The well task that the work structure 34 of the FIG. 15 robot 26 is equipped to perform is the creation of a temporary barrier between adjacent longitudinal portions of the tubular structure 144 in which the robot 26 is movably disposed. To create this barrier the robot 26 shown in FIG. 15 uses a small onboard pump 164 to inflate an inflatable seal structure 166 into sealing engagement with the interior side surface of the tubular structure 144. In FIG. 16, the robot 26 creates this barrier by utilizing a suitable compression structure 168 to axially compress a deformable seal structure 170 (as indicated by the arrow 172) in a manner radially expanding it (as indicated by the arrows 174) into sealing engagement with the interior side surface of the tubular structure 144.

Figure 17:
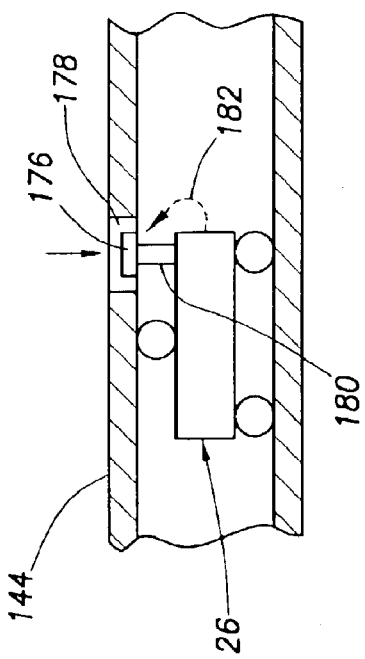
FIG. 17 is a schematic side elevational view of an embodiment of the robot being used to perform various operations on a sensor carried by a tubular structure in which the robot is movably disposed.

The tubular structure 144 within which the FIG. 17 robot 26 is movably disposed has a reprogrammable sensor 176 removably supported in a well 178 carried by the tubular structure. The work structure 34 of this robot 26 is equipped with a retractible member 180 adapted to grasp the sensor 176 and remove it from its associated well 178. The FIG. 15 robot 26 is also operative to transmit to the sensor 176 an output signal 182 operative to reprogram the sensor 176. This reprogramming may entail, for example but not by way of limitation, the changing of a sensing range of the sensor 176, the changing a data transmission rate of the sensor 176, the changing a choke setting of the sensor 176, or the changing an actuation sequence of the sensor 176.

Figure 18:
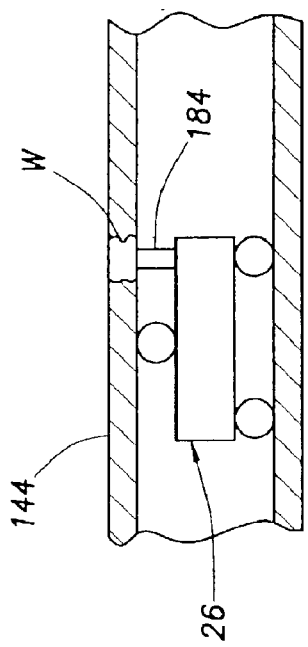
FIG. 18 is a schematic side elevational view of an embodiment of the robot being used to perform a welding operation in a tubular structure in which the robot is movably disposed.

The well task that the work structure 34 of the FIG. 18 robot 26 is equipped to perform is the creation, using a suitable welding member 184 of a weld W on the tubular structure 144 within which the robot 26 is movably disposed.

Figure 19:
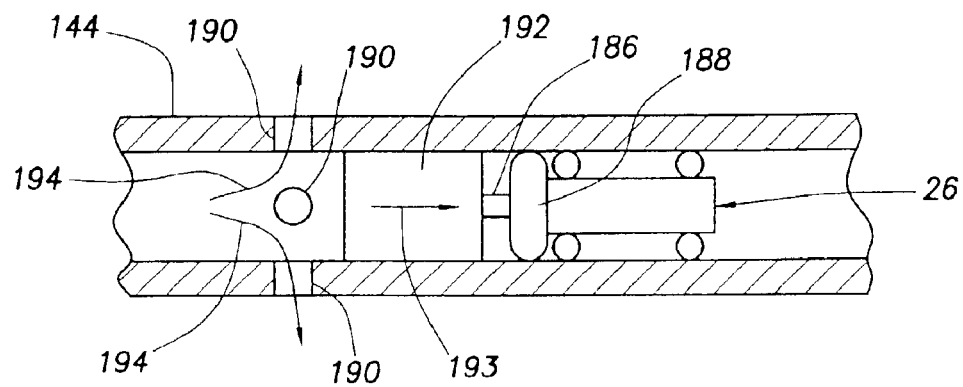
FIG. 19 is a schematic side elevational view of an embodiment of the robot being used in conjunction with an injection or cementing process being carried out through the interior of a tubular structure in which the robot is movably disposed.

The work structure 34 of the FIG. 19 robot 26 enables the robot 26 to be utilized in conjunction with an injection process (such as fracturing or cementing) and includes a sleeve shifting arm 186 and an expandable seal structure 188. Sidewall injection openings 190 are formed in the tubular structure 144 in which the robot 26 is movably disposed, and are normally covered by a sliding sleeve structure 192. To carry out the injection process, the shifting arm 186 is used to slide open the sleeve 192 (as indicated by the arrow 193), and the seal structure 188 is expanded to create a barrier between the openings 190 and the longitudinal portion of the tubular structure 144 downhole therefrom. The injection fluid 194 may then be flowed toward the robot 26 and forced outwardly through the now uncovered sidewall openings 190.

Figure 20:
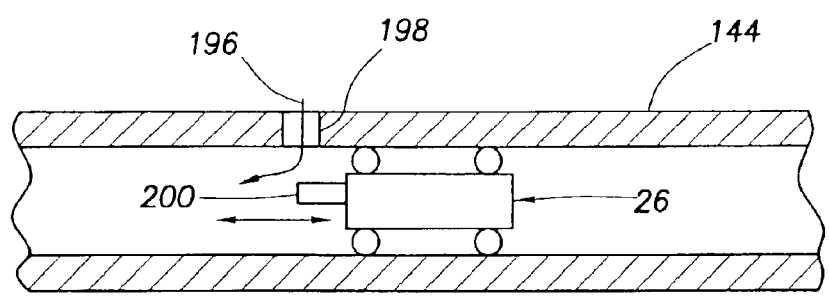
FIG. 20 is a schematic side elevational view of an embodiment of the robot being used to variably throttle a flow of fluid through a sidewall opening in a tubular structure in which the robot is disposed.

The well task that the work structure 34 of the FIG. 20 robot 26 is equipped to perform is the variable throttling of fluid 196 flowing inwardly through a sidewall opening 198 in the tubular structure 144 in which the robot 26 is movably disposed. To effect this variable throttling, the robot 26 is equipped with an axially extensible and retractible throttling member 200 which may be axially adjusted to laterally face a variable portion of the sidewall opening 198 and throttle the incoming fluid 196. This same robot work structure mechanism may also be utilized to variably throttle the flow of fluid exiting the opening 198.

Figure 21:
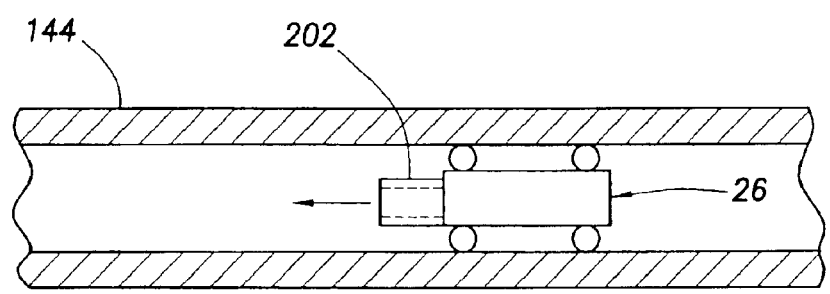
FIG. 21 is a schematic side elevational view of an embodiment of the robot being used to deploy a subsystem structure into the tubular structure in which the robot is movably disposed.

Finally, the work structure 34 of the FIG. 21 robot 26 is operative to permit the robot to perform a well task in which a subsystem structure (for example, a subsystem sleeve 202), which is carried by the robot 26 for movement therewith, is ejected into the interior of the tubular structure 144 in which the robot 26 is movably disposed.

Robot 26, as described above in various illustrative forms, has been representatively and schematically depicted as being movable through an unbranched overall tubular structure such as, for example, the production tubing/casing structure 20,16 shown in FIG. 1. However, as will be readily appreciated by those of ordinary skill in this particular art, the robot could be provided with appropriate on-board systems to allow it to enter various legs of a multi-lateral completion. Accordingly, as used herein the term "tubular structure" is intended to encompass both unbranched tubular structures as representatively shown herein and branched tubular structures such as those incorporated in multi-lateral completions. The onboard systems adapting the robot for multi-lateral completion applications may include appropriate sensors and inertial guidance and position systems, for example, to allow the robot to navigate itself through a complex architecture of a modern completion.

The foregoing detailed description is to be clearly understood as being given by way of illustration and example only, the spirit and scope of the present invention being limited solely by the appended claims.

What is claimed is:

1. A subterranean well completion comprising:

a tubular structure extending through the earth; and a remote controlled robot disposed in the tubular structure and being capable of performing downhole well tasks, the robot being operable to utilize power from a source thereof to propel itself along the interior of the tubular structure, perform a predetermined downhole well task; and then park within the tubular structure until another well task is to be performed by the robot, the source of power including a power structure carried by the robot, the power structure being a rechargeable electric battery and further including downhole electrical recharging apparatus, the robot being selectively associateable with the recharging apparatus in a manner permitting the rechargeable battery to be recharged by the electrical recharging apparatus, the downhole electrical recharging apparatus being operative to recharge the rechargeable electric battery in response to movement of the robot to a predetermined position relative to a portion of the down hole electrical recharging apparatus.

2. A subterranean well completion comprising:

a tubular structure extending through the earth; and a remote controlled robot disposed in the tubular structure and being capable of performing downhole well tasks, the robot being operable to utilize power from a source thereof to propel itself along the interior of the tubular structure, perform a predetermined down hole well task; and then park within the tubular structure until another well task is to be performed by the robot, the source of power including a power structure carried by the robot, the power structure being a rechargeable electric battery and further including downhole electrical recharging apparatus, the robot being selectively associateable with the recharging apparatus in a manner permitting the rechargeable battery to be recharged by the electrical recharging apparatus, the robot having a charging signal generating structure, and the downhole electrical recharging apparatus being operative to recharge the rechargeable electric battery, in response to generation of a charging signal by the robot, when the robot is positioned adjacent a predetermined portion of the downhole electrical recharging apparatus, and terminate the recharging in response to cessation of the charging signal.

3. A subterranean well completion comprising:

a tubular structure extending through the earth; and a remote controlled robot disposed in the tubular structure and being capable of performing downhole well tasks, the robot being operable to utilize power from a source thereof to propel itself along the interior of the tubular structure, perform a predetermined downhole well task; and then park within the tubular structure until another well task is to be performed by the robot, the source of power including a power structure carried by the robot, the power structure being a rechargeable electric battery and further including downhole electrical recharging apparatus, the robot being selectively associateable with the recharging apparatus in a manner permitting the rechargeable battery to be recharged by the electrical recharging apparatus, the downhole electrical recharging apparatus including docking structure carried by the tubular structure and to which the robot may be docked while its battery is being recharged by the downhole electrical recharging apparatus, the docking structure being operative, when the robot is docked thereto, to generate an output signal, which may be transmitted to the surface, indicative of the location of the robot within the tubular structure.

4. A subterranean well completion comprising:

a tubular structure extending through the earth; and a remote controlled robot disposed in the tubular structure and having a work structure, the robot being operable to utilize power from a source thereof to propel itself along the interior of the tubular structure to a location therein at which a predetermined well task is to be performed, activate the work structure to perform the predetermined well task, and then park in the tubular structure until needed to perform another well task, the robot having a retractible external driving structure operable to propel the robot in opposite directions along the length of the interior of the tubular structure, the tubular structure having first and second adjacent longitudinal portions with different interior diameters, and the driving structure being adapted to permit the robot to move between the first and second longitudinal portions and operate in either of them.

5. The subterranean well completion of claim 4 wherein:
the tubular structure Is a length of production tubing.

6. The subterranean well completion of claim 4 wherein:
the tubular structure is a length of casing.

7. The subterranean well completion of claim 4 wherein:
the robot is operable to park itself at a location in the tubular structure remote from the location therein at which the robot performed the predetermined well task.

8. The subterranean well completion of claim 4 further comprising:
cooperatively and releasably engageable locating structures on the robot and the tubular structure.

9. The subterranean well completion of claim 8 wherein:
the cooperatively and releasably engageable locating structures include a locating profile interiorly disposed on the tubular structure.

10. The subterranean well completion of claim 4 wherein:
the robot is operable without physical intervention into the tubular structure between the surface and the robot.

11. The subterranean well completion of claim 4 wherein:
the tubular structure is operative to permit fluid flow therethrough, and the robot is configured in a manner such that it laterally blocks no more than about eighty percent of the fluid flow area within the tubular structure.

12. A subterranean well completion comprising:

a tubular structure extending through the earth; and a remote controlled robot disposed in the tubular structure and having a work structure, the robot being operable to utilize power from a source thereof to propel itself along the interior of the tubular structure to a location therein at which a predetermined well task is to be performed, activate the work structure to perform the predetermined well task, and then park in the tubular structure until needed to perform another well task, the tubular structure being operative to permit fluid flow therethrough, the robot being configured in a manner such that it laterally blocks no more than about eighty percent of the fluid flow area within the tubular structure, and the robot having opposite open ends spaced apart along the axis of the tubular structure, and an interior through which the opposite open ends communicate.

13. A subterranean well completion comprising:

a tubular structure extending through the earth, the tubular structure having a powering structure adapted to receive electrical power from the earth's surface;

a remote controlled, self-propelled, work-performing robot disposed in the tubular structure and being powered by an onboard rechargeable battery, the robot having a power receiving portion positionable relative to the powering structure to receive electrical power therefrom to recharge the battery; and communication apparatus operative to provide information communication between the earth and the robot, the operation of the robot being programmable, and wherein the robot may be reprogrammed via the communication apparatus, the well completion further comprising a downhole sensor separate from the robot and operative to sense the value of a downhole parameter, and the robot further having a sensor detection portion operative to retrieve from the sensor the sensed value of the parameter and transmit the sensed value to the surface via the communication apparatus.

14. The subterranean well completion of claim 13 wherein:
the power receiving portion is inductively coupleable to the powering structure.

15. The subterranean well completion of claim 13 further comprising:
electrical power supply wiring extending to the surface from the powering structure.

16. The subterranean well completion of claim 13 wherein:
the robot further has a sensor disposed thereon, the sensor being operative to sense the value of a predetermined downhole parameter and transmit the value of the sensed parameter to the surface via the communication apparatus.

17. The subterranean well completion of claim 13 wherein:
the communication apparatus includes communication structure carried by the robot, and associated communication structure carried by the tubular structure.

18. The subterranean well completion of claim 17 wherein:
the communication structure carried by the tubular structure is connected to the surface by fiber optic cable.

19. The subterranean well completion of claim 13 wherein:
the communication apparatus includes communication structure carried by the robot and providing it with wireless communication with the surface.

20. The subterranean well completion of claim 13 wherein:
the downhole sensor is mounted on the tubular structure.

21. The subterranean well completion of claim 13 wherein:
the robot is programmable and is pre-programmed to autonomously perform at least one downhole well task.

22. The subterranean well completion of claim 13 wherein:
the tubular structure is a length of production tubing.

23. The subterranean well completion of claim 13 wherein:
the tubular structure is a length of casing.

24. The subterranean well completion of claim 13 wherein:
the robot is operative to perform a predetermined well task within the tubular structure.

25. The subterranean well completion of claim 24 wherein:
the robot is operative to park itself in the tubular structure, subsequent to the performance of the predetermined well task, until a second well task is to be performed within the tubular structure.

26. The subterranean well completion of claim 25 wherein:
the robot is operative to park itself at a location in the tubular structure spaced apart along the length of the tubular structure from the location of the predetermined well task.

27. The subterranean well completion of claim 13 wherein:
the powering structure includes a spaced plurality of powering structures spaced apart along the length of the tubular structure, and
the robot is positionable within the tubular structure to sequentially receive electrical power from the powering structures.

28. The subterranean well completion of claim 27 wherein:
the powering structures include docking structures with which the robot is engageable to park the robot within the tubular structure.

29. The subterranean well completion of claim 27 wherein:
each powering structure is operative to transmit a signal to the communication portion indicating that the robot is receiving power from the powering structure, the signal thereby being indicative of the position of the robot within the tubular structure.

30. A subterranean well completion comprising:
a tubular structure extending through the earth, the tubular structure having a powering structure adapted to receive electrical power from the surface;
a remote controlled, self-propelled, work-performing robot disposed in the tubular structure and being powered by an onboard rechargeable battery, the robot having a power receiving portion positionable relative to the powering structure to receive electrical power therefrom to recharge the battery; and
communication apparatus operative to provide information communication between the earth and the robot, the tubular structure having first and second adjacent longitudinal portions having different interior diameters, and
the robot having a retractible exterior propulsion structure enabling the robot to enter either longitudinal portion from the other longitudinal portion and perform work in the entered portion of the tubular structure.

31. A method of operating a subterranean well completion having a tubular structure extending through the earth, the method comprising the steps of:
providing a remote controlled, self-propelled robot;
disposing the robot within the tubular structure, the robot having an onboard rechargeable electric battery;
utilizing the robot to perform a first predetermined well task in the tubular structure at a predetermined location therein;
utilizing a downhole electrical power source to recharge the electric battery, the downhole electrical power source including a longitudinally spaced plurality of downhole electrical recharging stations carried by the tubular structure,
parking the robot within the tubular structure; and then
causing the robot to perform a second predetermined well task in the tubular structure,
the robot being programmable, and
the method further comprising the step of programming the robot to access the closest recharging station to receive electrical power therefrom.

32. A method of operating a subterranean well completion having a tubular structure extending through the earth, the method comprising the steps of:
providing a remote controlled, self-propelled robot;
disposing the robot within the tubular structure, the robot having an onboard rechargeable electric battery;
utilizing the robot to perform a first predetermined well task in the tubular structure at a predetermined location therein;
utilizing a downhole electrical power source to recharge the electric battery, the downhole electrical power source including a longitudinally spaced plurality of downhole electrical recharging stations carried by the tubular structure,
parking the robot within the tubular structure; and then
causing the robot to perform a second predetermined well task in the tubular structure,
the robot being operative to transmit a power requirement signal, and
the method further comprising the step of requiring the receipt of the power requirement signal by a recharging station before it can transmit electrical power to the robot.

33. A method of operating a subterranean well completion having a tubular structure extending through the earth, the method comprising the steps of:
providing a remote controlled, self-propelled robot;
disposing the robot within the tubular structure, the robot having an onboard rechargeable electric battery;
utilizing the robot to perform a first predetermined well task in the tubular structure at a predetermined location therein;
utilizing a downhole electrical power source to recharge the electric battery, the downhole electrical power source including a longitudinally spaced plurality of downhole electrical recharging stations carried by the tubular structure;
utilizing the operative association of the robot with one of the recharging stations to generate a signal indicative of the longitudinal position of the robot within the tubular structure;
parking the robot within the tubular structure; and then
causing the robot to perform a second predetermined well task in the tubular structure.

34. A method of operating a subterranean well completion having a tubular structure extending through the earth, the method comprising the steps of:
providing a remote controlled, self-propelled robot;
disposing the robot within the tubular structure;
utilizing the robot to perform a first predetermined well task in the tubular structure at a predetermined location therein;
parking the robot within the tubular structure; and then
causing the robot to perform a second predetermined well task in the tubular structure; and
configuring the robot in a manner such that, at its longitudinal position within the tubular structure, it blocks no more than about eighty percent of the flow area of the tubular structure,
the configuring step being performed by providing the robot with a hollow configuration in which its interior opens outwardly through open uphole and downhole ends thereof.

35. A method of operating a subterranean well completion having a tubular structure extending through the earth, the method comprising the steps of:
providing a remote controlled, self-propelled robot;

disposing the robot within the tubular structure;
utilizing the robot to perform a first predetermined well task in the tubular structure at a predetermined location therein;
parking the robot within the tubular structure; and then
causing the robot to perform a second predetermined well task in the tubular structure,
the tubular structure having adjacent longitudinal portions with differing interior diameters, and
the method further comprising the step of configuring the robot in a manner such that it can enter either longitudinal portion from the other longitudinal portion and perform a well task in the entered longitudinal portion.

36. The method of claim 35 wherein:
the configuring step includes the step of providing the robot with a retractible external drive structure.

* * * * *